United States Patent [19]

Zwecker et al.

[11] Patent Number: 5,132,343

[45] Date of Patent: Jul. 21, 1992

[54] LOW-EVAPORATION POLYESTER RESINS

[75] Inventors: Joachim Zwecker, Weinheim; Holger Schreiner, Goellheim, both of Fed. Rep. of Germany

[73] Assignee: BASF Aktiengesellschaft, Ludwigshafen, Fed. Rep. of Germany

[21] Appl. No.: 594,023

[22] Filed: Oct. 9, 1990

[30] Foreign Application Priority Data

Oct. 9, 1989 [DE] Fed. Rep. of Germany ....... 3933656

[51] Int. Cl.$^5$ .............................................. C08L 67/06
[52] U.S. Cl. ..................................... 523/518; 523/521
[58] Field of Search ............... 524/442, 443, 474, 487, 524/522, 556; 523/518, 521

[56] References Cited

U.S. PATENT DOCUMENTS

| | | | |
|---|---|---|---|
| 4,272,424 | 6/1981 | Kitamura et al. | 525/228 |
| 4,546,142 | 10/1985 | Walewski | 524/487 |
| 4,619,953 | 10/1986 | Schols et al. | 524/487 |
| 4,931,375 | 6/1990 | Akimoto et al. | 430/99 |

FOREIGN PATENT DOCUMENTS

| | | | |
|---|---|---|---|
| 0000941 | 3/1979 | European Pat. Off. | 524/487 |
| 2182341 | 5/1987 | United Kingdom . | |

Primary Examiner—Paul R. Michl
Assistant Examiner—Andrew E. C. Merriam
Attorney, Agent, or Firm—Oblon, Spivak, McClelland, Maier & Neustadt

[57] ABSTRACT

Stable, low-evaporation unsaturated polyester resins contain an ethylenically unsaturated polyester, styrene as comonomer, paraffins for preventing styrene evaporation and a pyrogenic silica with both hydrophilic and hydrophobic end groups.

6 Claims, No Drawings

LOW-EVAPORATION POLYESTER RESINS

The present invention relates to stable, low-evaporation unsaturated polyester resins which contain an ethylenically unsaturated polyester, styrene as comonomer, paraffins for preventing the evaporation of the styrene, and also pyrogenic silica.

It is known that paraffins are capable of forming a thin film on liquid polyester resins which prevents the evaporation of the styrene comonomer. A most suitable combination of paraffins is disclosed in EP-A-941. The polyester resins described therein are also notable for good overlaminability, i.e. for adequate adhesion of a plurality of layers of resin laminates.

To prepare low-evaporation resins, the paraffins are customarily stirred into the liquid resins. In the course of stirring, they become finely dispersed in the resin, and the paraffin particles at the surface form a very thin layer which constantly re-forms in the event of changes to the surface, for example due to stirring or transfer of the resin.

It has since been found that this fine dispersion of the paraffin in the resin is not stable; the dispersion separates in the course of a few days or weeks, and the paraffins, having a lower specific weight, rise to the top and form a thick surface layer. In the event of changes to the resin surface the paraffin then no longer acts as an evaporation inhibitor.

It is also known that hydrophilic silicas, on addition to polyester resins in amounts of from 1 to 2%, confer thixotropic properties on the said resins. This means that the resins are highly viscous in the stationary state, but on shearing their viscosity decreases and they become processable. A secondary effect of the addition of silica to highly viscous resins is that the above-described separation of resin and paraffin does not take place; that is, thixotroped resins are stable in respect of the evaporation-inhibiting paraffin additive. However, there are many purposes, for example winding resins, where thixotropy is undesirable.

In the case of vinyl ester resins the addition of paraffin to reduce styrene evaporation has hitherto not been a practical proposition, since separation there is rather rapid.

It is an object of the present invention to develop non-thixotroped low-evaporation unsaturated polyester resins which do not lose their favorable properties even after several months, i.e. where the evaporation-reducing paraffin additives remain dispersed in the polyester resin even after prolonged storage.

We have found that this object is achieved according to the present invention by adding to a resin containing A. an ethylenically unsaturated polyester,
B. styrene and
C. a paraffin from 0.004 to 0.4% by weight, based on A+B, of a pyrogenic silica D which contains not only hydrophilic Si—OH but also hydrophobic Si—R end groups.

GB-A-2,182,341 describes unsaturated polyester resins which contain waxy substances to suppress styrene emission, hydrophilic pyrogenic silicas as thixotropes and also from 0.01 to 2.5% of a hydrophobic silica which is to act as adhesion promoter to improve laminability. If, then, starting from the conjoint addition of hydrophilic and hydrophobic silicas according to GB 2,182,341, the amount of silica is reduced to a level where there is virtually no longer any thixotroping effect, the purpose of the present invention is therefore not achieved. This is because it is found that the silicas gradually settle out in the resin, so that the stabilizing effect on the paraffin dispersion is lost. A consequence thereof is that the desired stability is not achieved. Incidentally, the same effect is also observed when either purely hydrophilic or purely hydrophobic silica alone is added in small amounts.

The individual components will now be described in detail:

A. Unsaturated polyesters

Unsaturated polyesters A are the customary condensation products of polybasic, in particular dibasic, carboxylic acids and their esterifiable derivatives, in particular the anhydrides, and polyhydric, in particular dihydric, alcohols, which products may additionally contain radicals of monobasic carboxylic acids, of monohydric alcohols or of hydroxycarboxylic acids, provided at least some of the radicals have ethylenically unsaturated copolymerizable groups. Suitable polyhydric, in particular dihydric, saturated or unsaturated alcohols are the customary alkane- and oxaalkanediols containing in particular acyclic groups, cyclic groups or both, e.g. ethylene glycol, 1,2-propylene glycol, 1,3-propanediol, 1,3-butylene glycol, 1,4-butanediol, 1,6-hexanediol, 2,2-dimethylpropane-1,3-diol, diethylene glycol, triethylene glycol, polyethylene glycol, 1,2-cyclohexanediol, 2,2-bis-(p-hydroxycyclohexyl)propane and trimethylolpropane monoallyl ether.

It is also possible to use monohydric, trihydric or more highly hydric alcohols, for example ethylhexanol, fatty alcohols, benzyl alcohols, 1,2-di(allyloxy)-3-propanol, glycerol, pentaerythritol or trimethylolpropane, in minor amounts. The polyhydric, in particular dihydric, alcohols are in general reacted in stoichiometric or substantially stoichiometric amounts with polybasic, in particular dibasic, carboxylic acids or condensable derivatives thereof.

Suitable carboxylic acids and derivatives thereof are dibasic, olefinically unsaturated, preferably $\alpha,\beta$-olefinically unsaturated, carboxylic acids, e.g. maleic acid, fumaric acid, chloromaleic acid, itaconic acid, citraconic acid, methyleneglutaric acid and mesaconic acid, and the esters and preferably the anhydrides thereof. The polyesters may additionally contain other modifying dibasic unsaturated and/or saturated and also aromatic carboxylic acids, e.g. succinic acid, glutaric acid, $\alpha$-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid or hexachloroendomethylenetetrahydrophthalic acid, as Cocondensed units, and also monobasic, tribasic or more highly basic carboxylic acids, for example ethylenehexanoic acid, fatty acids, methacrylic acid, propionic acid, benzoic acid, 1,2,4-benzenetricarboxylic acid or 1,2,4,5-benzenetetracarboxylic acid. Preference is given to using maleic acid, maleic anhydride and fumaric acid.

The molar ratio of unsaturated to saturated dicarboxylic acid is preferably within the range from 1:0 to 1:2.5.

Mixtures of unsaturated polyesters, including those which have only a limited solubility in styrene and tend to crystallize, can likewise be used with advantage. Such readily crystallizing unsaturated polyesters can be based for example on fumaric acid, adipic acid, terephthalic acid, ethylene glycol, 1,4-butanediol, 1,6-hexanediol and neopentylglycol.

It is also possible to use unsaturated polyesters having preferably terminal double bonds.

The unsaturated polyesters have acid numbers of from 0.5 to 100, preferably from 2 to 30, and average molecular weights of approximately 800-6000, preferably 1000-4000.

The amorphous and (non)crystallizable unsaturated polyesters are in general prepared from their starting components by melt condensation or condensation under azeotropic conditions at 150°-220° C. in a continuous or batchwise manner.

It is also possible to use unsaturated polyesters modified with cyclopentene or cyclohexene groups.

For the purposes of the present invention, unsaturated polyesters also encompass the vinyl esters.

Vinyl esters are commonly reaction products of polyepoxides with unsaturated monocarboxylic acids, preferably methacrylic acid. These products are likewise dissolved in unsaturated monomers, preferably styrene. These resins are described for example in U.S. Pat. Nos. 3,066,112 and 3,179,623, where preference is given to vinyl ester resins based on bisphenol A. They combine high toughness and good chemical resistance with a limited heat resistance. Vinyl ester resins formed from epoxy novolak resins and (meth)acrylic acid, as described for example in U.S. Pat. No. 3,256,226, by contrast, have a higher heat resistance but a lower toughness.

The class of the vinyl ester resins is typified by the group

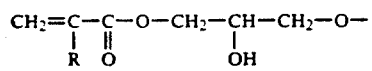

where R is H or $CH_3$.

The epoxy resins used for preparing the vinyl esters are derived from polyhydric phenols and alcohols. The epoxy equivalent weights can be within the range from 60 to 2000. The epoxy resins are synthesized by reaction of polyhydric phenols and alcohols with epichlorohydrin and subsequent dehydrochlorination with sodium hydroxide solution. The exact conditions for their preparation and typical representatives of this class of epoxy resins are described for example in the Handbook of Epoxy Resins, by Henry Lee and Kris Neville, McGraw-Hill, 1967.

Preferred epoxy resins are the glycidyl ethers based on bisphenol A which have epoxy equivalent weights of from 140 to 1000. A further suitable group of polyepoxides are those based on ring-hydrogenated bisphenol A and bisphenol F, 2,2-bis-(4-hydroxycyclohexyl)propane and bis(4-hydroxycyclohexyl)methane respectively, and also epoxidated cycloolefins. Furthermore, polyglycidyl ethers of novolak resins are an important group of epoxy resins. They include the condensation products of phenol or kresol with aldehydes such as formaldehyde or butyraldehyde and also the addition products of phenol or substituted phenols with olefins such as dicyclopentadiene, isoprene or norbornene. The group of preferred epoxy resins also includes those derived from alkylenepolyphenols, e.g. bis-(4-hydroxyphenyl)methane, 1,1,2,2-tetrakis(4-hydroxyphenyl)ethane and 1,1,3-tris(4-hydroxyphenyl)propane.

Examples of epoxy resins based on polyhydric aliphatic alcohols are the polyglycidyl ethers of 1,4-butanediol, 1,6-hexanediol, trimethylolpropane and poly-THF.

Unsaturated monocarboxylic acids for the purposes of the present invention are α,β-unsaturated carboxylic acids such as acrylic acid and methacrylic acid and also the monoesters of unsaturated dicarboxylic acids. Particular preference is given to methacrylic acid. The reaction of the epoxy resins with the unsaturated monocarboxylic acid is carried out without catalysts or in the presence of Lewis bases such as tertiary amines, triarylphosphines, acetates or alcoholates and also ammonium and phosphonium halides at 60°-130° C. in the presence of an inert solvent or in the melt. The mixing ratio used is from 0.6 to 1.1 equivalents of unsaturated monocarboxylic acid per epoxy group.

B. Monomers

The unsaturated polyester resins contain styrene as monomer. The polyester:styrene ratio is preferably from 20:80 to 90:10, in particular from 50:50 to 75:25. The comonomer styrene can be partly replaced by other customary ethylenically polymerizable monomers, for example vinyl compounds, such as substituted styrenes, esters of acrylic and methacrylic acid or allyl compounds, such as diallyl phthalate.

C. Suitable paraffins are the customary higher hydrocarbons, to be precise not only solid, waxy substances but also liquid paraffin oils. Preference is given to mixtures of paraffins having a melting point within the range from 25° C. to 50° C. and those having a melting point within the range from 51° C. to 100° C., as described in EP-A-941. It is also possible to use mixtures of paraffin oils, which increases the compatibility with the polyester resin. Particular preference is given to mixtures of all three of the paraffins mentioned in a ratio of about 1:1:1.

Component C is preferably present in the resin in amounts of from 0.01 to 2% by weight, in particular from 0.05 to 0.5% by weight, based on A+B.

D. The resin according to the present invention contains from 0.004 to 0.4% by weight, preferably from 0.01 to 0.1% by weight, of a pyrogenic silica which has not only hydrophilic Si—OH but also hydrophobic Si—R end groups. R is here $C_1$-$C_4$-alkyl, preferably methyl. The end groups are preferably to an extent of 10-90%, in particular 25-70%, Si—OH groups and to an extent of 90-10%, in particular 75-25%, Si—R groups. The ratio of Si—OH to Si—R groups can be determined by customary analytical methods, for example spectroscopically or by quantitative chemical end group analysis. Silicas having different end groups can be obtained for example by controlled addition of dichlorodimethylsilane in the course of the preparation of pyrogenic silica. A suitable commercial product which has the requisite properties is for example Aerosil R 974 from DEGUSSA, which has a hydrophilic to hydrophobic end group ratio of about 50:50.

In addition to components C and D the resins according to the present invention may also contain the customary additives, for example reinforcing fibers, e.g. glass and carbon fibers, fillers, e.g. chalk, quartz or a hydrated aluminum oxide, inhibitors, e.g. hydroquinone, polyfunctional hydroxy compounds, e.g. ethylene glycol and trimethylolpropane, lubricants such as waxes, flame retardants, in particular halogen compounds, thickeners, such as oxides or hydroxides of lithium, magnesium, calcium, aluminum or titanium, thickening accelerants, e.g. ammonium chlorides, phosphonium chlorides, sulfonium halides, water, polyols or 1,2-propanediol, curing accelerants, e.g. metal complexes or aromatic amines.

In the case of thixotroped polyester resins the use of thickeners is not suitable; the thixotropic index of the resins (as measured by Brookfield RVT) is therefore advantageously below 1.5, preferably about 1.

Components C and D and optionally the other additives are incorporated into the resin in a conventional manner, for example by stirring.

The polyester resins according to the present invention can be used in a conventional manner, in which case the low styrene emission is of great advantage.

In the Examples, the parts and percentages are by weight.

EXAMPLE 1

An unsaturated polyester was prepared by polycondensation of 1 part of orthophthalic acid, 2 parts of maleic anhydride and 3 parts of propylene glycol.

The polyester had an acid number of 30. It was dissolved in styrene in 67% strength, and the resulting resin had a viscosity of 1000 mPa.s at 23° C. To this resin were added 0,4% of a paraffin mixture (⅓ of paraffin having a melting point of 47° C., ⅓ of paraffin having a melting point of 57° C., and ⅓ of paraffin oil) and also 0.04% of Aerosil R 974.

The parameter measured not only on the polyester resin without addition but also on the resin according to the present invention was the styrene emission at 23° C. (100 g of resin distributed over an area of 15×15 cm$^2$, no air movement).

| Resin without addition: | $60 \, g \cdot m^{-2} \cdot h^{-1}$ |
| Resin according to the present invention: | $4 \, g \cdot m^{-2} \cdot h^{-1}$ |

The low styrene emission from the resin according to the present invention is still observed even after three months' storage.

EXAMPLE 2

A vinyl ester resin prepared by reacting 3.8 parts of bisphenol A diglycidyl ether with 1.7 parts of methacrylic acid.

This reaction product was dissolved in styrene in 60% strength. The resin then had a viscosity of 470 mPa.s at 23° C. 0.8% of the paraffin mixture according to Example 1 and 0.08% of Aerosil R 974 was then stirred into the resin.

| Styrene emission: | |
| --- | --- |
| Resin without addition: | $85 \, g \cdot m^{-2} \cdot h^{-1}$ |
| Resin according to the present invention: (still unchanged 3 months later). | $1 \, g \cdot m^{-2} \cdot h^{-1}$ |

We claim:

1. A low-evaporation unsaturated polyester resin containing
   A. an ethylenically unsaturated polyester,
   B. styrene,
   C. a paraffin,
   D. a pyrogenic silica,
wherein component D comprises from 0.004 to 0.4% by weight, based on A+B, of a silica which contains not only hydrophilic Si—OH but also hydrophobic Si—R end groups, R being $C_1$-$C_4$-alkyl.

2. A polyester resin as claimed in claim 1, which contains from 0.01 to 2% by weight, based on A+B, of paraffin C.

3. A polyester resin according to claim 1, wherein component C contains a paraffin which is solid at room temperature and a paraffin oil which is liquid at room temperature.

4. A polyester resin according to claim 1, wherein component C contains a paraffin having a melting point of from 25° C. to 50° C. and a paraffin having a melting point of from 51° C. to 100° C.

5. A polyester resin as claimed in claim 1, wherein the end groups of silica D are hydrophilic Si—OH groups to an extent of 10-90% and hydrophobic Si—CH$_3$ groups to an extent of 90-10%.

6. The polyester resin as claimed in claim 1, wherein said resin has a thixotropic index of below 1.5.

* * * * *